Figure 1:
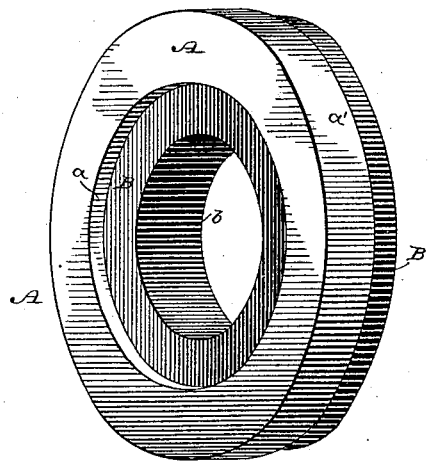

(No Model.)

F. TAYLOR.
NUT LOCK.

No. 326,345. Patented Sept. 15, 1885.

WITNESSES:
Ed. A. Newman,
Cel. C. Newman.

INVENTOR:
Franklin Taylor,
By his Attorneys
Baldwin, Hopkins & Peyton

UNITED STATES PATENT OFFICE.

FRANKLIN TAYLOR, OF WILMINGTON, DELAWARE, ASSIGNOR TO THE VULCANIZED FIBER COMPANY, OF SAME PLACE.

NUT-LOCK.

SPECIFICATION forming part of Letters Patent No. 326,345, dated September 15, 1885.

Application filed October 22, 1884. (No model.)

*To all whom it may concern:*

Be it known that I, FRANKLIN TAYLOR, of Wilmington, in the State of Delaware, have invented certain new and useful Improvements in Washers, of which the following is a specification.

My invention relates to composite washers particularly useful with the bolts and nuts of railway-tracks, although capable of use with the bolts and nuts of other devices and in other places.

My improved washer is made up of an elastic or compressible ring or body, preferably of what is known in the art as "vulcanized fiber," placed within or surrounded by a metal cap. Such a composite washer, broadly considered, is old, and is shown, for instance, in Courtenay's patent of April 18, 1882. Courtenay's washer, however, is defective in that the metal cap is constructed of thin flexible metal, which bends up under the pressure of the nut, so as to bite upon the edges of the nut to lock it from turning. By the use of the flexible-metal cap the elastic fiber ring or body is allowed to unduly expand and spread, and in use it is apt to be split or bursted. Moreover, in applying it to a track-bolt under heavy pressure the central portion of the fiber ring or body, which receives the pressure of the nut, is forced into the oblong bolt-hole in the fish-plate or splice, and each tightening-up of the nut of the bolt in the inspection and repair of the track, for instance, adds to this crowding of the fiber body into the bolt-hole, whereby the fiber ring or body is cut and comparatively soon destroyed.

In seeking to avoid the disadvantages of a flexible-metal cap the washer shown in Rodney's patent of December 12, 1882, was devised, and in that case the fiber or compressible ring or body was placed in one stiff-metal cap and retained in place therein while subjected to compression by another stiff-metal cap, the two caps being united together by the friction of interfitting and telescoping rims. In this case the undue expansion and spreading of the fiber body was prevented, and its crowding into the bolt-hole also avoided; but in attaining these ends the construction of the washer was complicated and its cost much increased, the additional cost in fact militating against the practical use of the washer.

The object of my invention, generally, is to provide washers of the type illustrated in the Rodney patent above mentioned, so as to obtain increased efficiency in use, and also to simplify its construction and diminish the cost.

The object of my invention, particularly, is to provide a composite washer in which the fiber body is prevented from unduly expanding or spreading, and also prevented from being forced into the bolt-hole around the bolt.

My invention consists, first, of a composite washer consisting of a stiff-metal cap in which a ring or body of vulcanized fiber or similar material is seated and compressed under pressure, so as to firmly unite the fiber body to the metal cap and constitute the two a composite washer.

My invention also consists of a composite washer consisting of a metal cap having seated therein an elastic or compressible ring or body with the bolt-hole in said metal cap materially larger than that through the compressible ring or body, whereby upon the tightening or screwing up of the nut the central portion of the compressible ring or body will remain substantially unsubjected to the pressure of the nut which bears upon the cap, and thereby prevented from being unduly crowded into the bolt-hole, which, as stated above, would lead to the destruction of the washer in use.

In the accompanying drawings I have shown my improvements as embodied in a washer in the best way now known to me.

Figure 2:
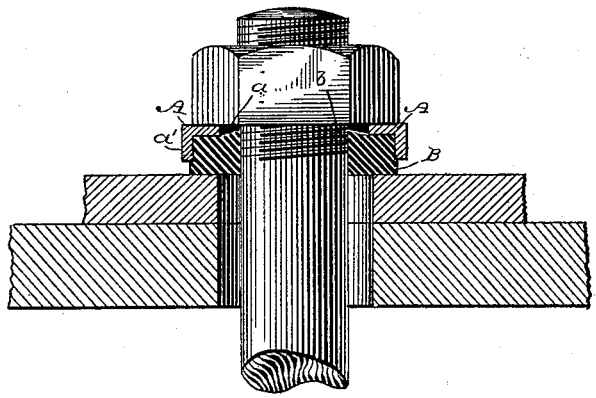

In said drawings, Figure 1 is a perspective view of my improved washer, and Fig. 2 is a section thereof as applied to a track-bolt.

A stiff-metal cap or cup, A, preferably of malleable iron, has seated within it a compressible or elastic ring or body, B, preferably of vulcanized fiber, a material by experience found to be well adapted for use in washers which are subjected to heavy strains, such as the washers of railway-track bolts. Said cap A has a comparatively large bolt-hole, $a$, while the bolt-hole $b$ of the vulcanized fiber ring or body B is of less diameter than said hole $a$ of the cap A, and is a trifle larger than the diameter of the bolt to which the washer is to be applied. The depth or thickness of the vulcanized-fiber ring or body B is greater than the thickness of the flange or rim $a'$ of the cap A, so that a portion of said ring or body projects beyond the open or flange side of said cap. Said ring or body B is made a trifle larger in diameter—say the one-thirty second part of an inch—than the inner diameter or seat of the cap A, and is forced into its seat in said cap by the exercise of pressure—say a pressure of two hundred and fifty pounds, more or less. By making the vulcanized-fiber ring or body B a trifle larger than the seat in the stiff-metal cap A which it is to occupy, and compressing or forcing the fiber ring into its seat in said cap, the fiber ring and the metal cap are firmly united together, so as to constitute a composite washer, and by the use of the stiff-metal cap the fiber body is prevented from spreading laterally when the pressure of the nut is applied in use. This feature of a fiber or equivalent compressible body compressed within a stiff-metal cap is very important, as not only is the efficiency and durability of the washer increased, but its cost much decreased and the manufacture facilitated.

Another important feature of my invention is the compressible ring or body with a metal cap having a bolt-hole of larger diameter than that of said compressible ring or body. In such a construction the metal cap takes up the wear and prevents abrasion of the fiber body by the nut, and at the same time the pressure of the nut is brought upon the compressible ring or body near its periphery or outer portion, while the central portions or inner edge of said ring, which surrounds the bolt, is practically exempt from such pressure, the result being that when the nut is screwed up and compressed upon the washer the fiber body is only compressed at its outer edges or portion, while the inner edge, which surrounds the bolt, spreads laterally and expands to a small extent, but is not crowded into the oblong bolt-hole of the usual fish-plate, which is objectionable, for the reason, as before stated, that the washer by repeated tightenings is liable to be cut and destroyed where the central portion of the fiber ring or body is subjected to the pressure of the nut.

When the pressure of the nut is applied upon the washer in my construction, the fiber ring is spread inwardly to a small extent and outwardly into the enlarged opening of the metal cap, but does not spread and is not crowded into the bolt-hole to an extent sufficient for injury.

I do not claim, of course, a washer having any such construction and mode of operation as that patented to George W. Billings, December 14, 1869, as No. 97,752. In the Billings patent there is no stiff-metal cap, but an elastic concavo-convex one of spring-steel, for the purposes of compensating for expansion and contraction of the bolt to which the washer may be applied; nor does that patent show or describe any such compressible ring or body as is contemplated in this case. The Billings washer has an elastic filling, which, when the pressure of the nut is applied to the washer, is forced into the concave or recess of the elastic-metal cap, but has no action whatever beyond the edges or rim of said cap. There is no similarity at all between the Billings washer and my own, either in construction or mode of operation.

Without further elaboration of my improvements, which have been practically demonstrated, I state my claims herein as follows:

1. A washer consisting of a stiff non-elastic metal cap with a compressible ring or body of greater thickness than the flange or rim of said cap seated therein and united thereto by pressure, substantially as described.

2. A washer consisting of a stiff-metal cap having a compressible ring or body seated therein, said cap having a bolt-hole or opening materially larger than the bolt-hole or opening in the compressible ring or body, substantially as described, whereby the pressure of the nut upon the metal ring compresses the outer portion of the compressible ring or body and substantially exempts the inner edge surrounding the bolt-hole of said ring or body from such pressure.

In testimony whereof I have hereunto subscribed my name.

FRANKLIN TAYLOR.

Witnesses:
W. P. WEBB,
E. M. TAYLOR.